United States Patent
Hsieh et al.

(10) Patent No.: US 12,373,994 B2
(45) Date of Patent: Jul. 29, 2025

(54) METHOD FOR TRANSPARENTIZING TARGET OBJECT AND IMAGE PROCESSING SYSTEM

(71) Applicant: AVER INFORMATION INC., New Taipei (TW)

(72) Inventors: Ren-Pao Hsieh, New Taipei (TW); Jun Hsu Tsai, New Taipei (TW); Yun-Long Sie, New Taipei (TW)

(73) Assignee: AVER INFORMATION INC., New Taipei (TW)

( * ) Notice: Subject to any disclaimer, the term of this patent is extended or adjusted under 35 U.S.C. 154(b) by 254 days.

(21) Appl. No.: 18/116,263

(22) Filed: Mar. 1, 2023

(65) Prior Publication Data
US 2023/0290013 A1    Sep. 14, 2023

(30) Foreign Application Priority Data
Mar. 9, 2022   (TW) .................................. 111108480

(51) Int. Cl.
*G06T 11/00* (2006.01)
*G06T 7/194* (2017.01)

(52) U.S. Cl.
CPC .............. *G06T 11/00* (2013.01); *G06T 7/194* (2017.01); *G06T 2207/20132* (2013.01); *G06T 2210/62* (2013.01)

(58) Field of Classification Search
CPC ..................... G06T 11/00; G06T 7/194; G06T 2207/20132; G06T 2210/62; G06T 2207/20084; G06T 7/11
See application file for complete search history.

(56) References Cited

U.S. PATENT DOCUMENTS

| | | | |
|---|---|---|---|
| 6,317,128 B1* | 11/2001 | Harrison | G06T 15/503 345/629 |
| 6,741,755 B1* | 5/2004 | Blake | G06T 5/73 382/257 |
| 9,390,506 B1* | 7/2016 | Asvatha Narayanan | G06T 7/248 |
| 11,317,060 B1* | 4/2022 | Libin | H04N 7/157 |

(Continued)

FOREIGN PATENT DOCUMENTS

CN          101447082 A   *   6/2009

*Primary Examiner* — Alicia M Harrington
*Assistant Examiner* — Christine Yera Ahn
(74) *Attorney, Agent, or Firm* — Maschoff Brennan (57) ABSTRACT

A method for transparentizing a target object of a video includes following steps performed by a processor: extracting a target block corresponding to an target object from a frame of the video; setting a target transparentizing weight corresponding to the target block; performing a dilation operation upon the target block to generate a dilation outline enclosing the target block; setting a dilation transparentizing weight according to a dilation region, wherein the dilation region is a region inside the dilation outline and outside the target block; cutting a background block from the frame according to the dilation outline; and performing an overlapping operation according to a previous background block, the background block, the target block, the target transparentizing weight, the dilation region, and the dilation transparentizing weight to generate an output frame, wherein the previous background block does not correspond to the target object.

8 Claims, 6 Drawing Sheets

(56) References Cited

U.S. PATENT DOCUMENTS

| | | | |
|---|---|---|---|
| 2012/0306904 A1* | 12/2012 | Francois | A63F 13/52 |
| | | | 345/589 |
| 2013/0188833 A1* | 7/2013 | Hassan-Shafique | |
| | | | G08B 13/19602 |
| | | | 382/103 |
| 2018/0144476 A1* | 5/2018 | Smith | G06T 7/174 |
| 2020/0304713 A1* | 9/2020 | Zhao | H04N 7/15 |
| 2021/0076105 A1* | 3/2021 | Parmar | H04N 21/234336 |
| 2021/0248361 A1* | 8/2021 | Matsuo | G06T 7/20 |
| 2023/0124466 A1* | 4/2023 | Shimauchi | G06V 20/63 |
| | | | 345/629 |
| 2024/0331517 A1* | 10/2024 | Amir | G08B 15/02 |

* cited by examiner

METHOD FOR TRANSPARENTIZING TARGET OBJECT AND IMAGE PROCESSING SYSTEM

CROSS-REFERENCE TO RELATED APPLICATIONS

This non-provisional application claims priority under 35 U.S.C. § 119(a) on Patent Application No(s). 111108480 filed in Taiwan on Mar. 9, 2022, the entire contents of which are hereby incorporated by reference.

BACKGROUND

1. Technical Field

The present disclosure relates to object detection, instance segmentation, and image processing, and more particularly to a method for transparentizing a target object.

2. Related Art

In teaching videos, if the body of the speaker (such as a teacher) blocks the blackboard or the slide, the viewers (such as students) may feel inconvenient since they cannot see the blocked content.

Although there is a method for transparentizing the speaker's body currently, this technology is still far from perfect. In other words, the existing technology focuses on cutting out the foreground and the background, where the foreground is the speaker and the background is the blackboard or slide containing handwriting (or the foreground is the handwriting on the blackboard or slide and the background is the part outside the foreground), and then adjusting the RGB values of the foreground and the background and then overlapping them to achieve the effect of transparency. However, this method may cause afterimages or visual margins used to stitch the foreground and the background, which reduces the viewer's viewing experience. Additionally, when the speaker's clothing is too bright, it is not possible to clearly see the contents on the blackboard or slide blocked by the clothing using the current transparentizing method.

SUMMARY

Accordingly, the present disclosure proposes a method for transparentizing a target object and an image processing system.

According to an embodiment of the present disclosure, a method for transparentizing a target object of a video includes a plurality of steps performed by a processor. The plurality of steps includes: extracting a target block corresponding to the target object from a frame of the video; setting a target transparentizing weight corresponding to the target block; performing a dilation operation to the target block to generate a dilation outline enclosing the target block; setting a dilation transparentizing weight corresponding to a dilation region, wherein the dilation region is a region inside the dilation outline and outside the target block, and the dilation transparentizing weight is different from the target transparentizing weight; cutting a background block from the frame according to the dilation outline; and performing an overlapping operation according to a previous background block, the background block, the target block, the target transparentizing weight, the dilation region, and the dilation transparentizing weight to generate an output frame, wherein the previous background block does not correspond to the target object.

According to an embodiment of the present disclosure, a method for transparentizing a target object of a video includes a plurality of steps performed by a processor. The plurality of steps includes: extracting a first target block and a first background block from a first frame of the video, wherein the first target block corresponds to the target object, and the first background block does not correspond to the target object; setting a target transparentizing weight corresponding to the first target block; extracting a second target block and a second background block from a second frame of the video, wherein the second frame is delayed from the first frame, the second target block corresponds to the target object, and the second background block does not correspond to the target object; determining, based on a pixel scale, a number of different pixels between the second background block and the first background block according to a mixture of Gaussian model; wherein when the number of different pixels is greater than a difference threshold, deleting the first background block and the second background block, and resetting the target transparentizing weight; when the number of different pixels is not greater than the difference threshold, updating the first background block according to the second background block to generate an updated first background block; and performing an overlapping operation according to a previous background block, the updated first background block, the target transparentizing weight, and one of the first target block and the second target block to generate an output frame.

According to an embodiment of the present disclosure, an image processing system includes a camera, a display, and a processor. The camera is configured to record a target object to generate a video. The display is configured to show an output video according to an output frame. The processor is electrically connected to the camera and the display. The processor is configured to execute a plurality of instructions to generate the output frame, and the plurality of instructions includes: extracting a target block corresponding to the target object from a frame of the video; setting a target transparentizing weight corresponding to the target block; performing a dilation operation to the target block to generate a dilation outline enclosing the target block; setting a dilation transparentizing weight corresponding to a dilation region, wherein the dilation region is a region inside the dilation outline and outside the target block, and the dilation transparentizing weight is different from the target transparentizing weight; cutting a background block from the frame according to the dilation outline; and performing an overlapping operation according to a previous background block, the background block, the target block, the target transparentizing weight, the dilation region, and the dilation transparentizing weight to generate an output frame, wherein the previous background block does not correspond to the target object.

In view of the above, the method for transparentizing the target object proposed by the present disclosure and the image processing system have good transparency effect for the target object. The output video generated by using the present disclosure will not visually show the obvious separation line between the target object and the background. The present disclosure improves the shortcomings of the known object detection algorithm and the instance segmentation algorithm. The present disclosure improves the visual effect of the transparentized target object through the mechanism of multiple dilation outlines corresponding to multiple dilation transparentizing weights, and delays to update target block to avoid the afterimage of target object in the video. The present disclosure further dynamically adjusts the transparentizing weight of the target object according to the degree of saturation of the target object. Even if the speaker wears bright clothes, the viewer seeing the output video may see the blackboard text behind the transparentized speaker.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. According to the description, claims and the drawings disclosed in the specification, one skilled in the art may easily understand the concepts and features of the present invention. The following embodiments further illustrate various aspects of the present invention, but are not meant to limit the scope of the present invention.

Figure 1:
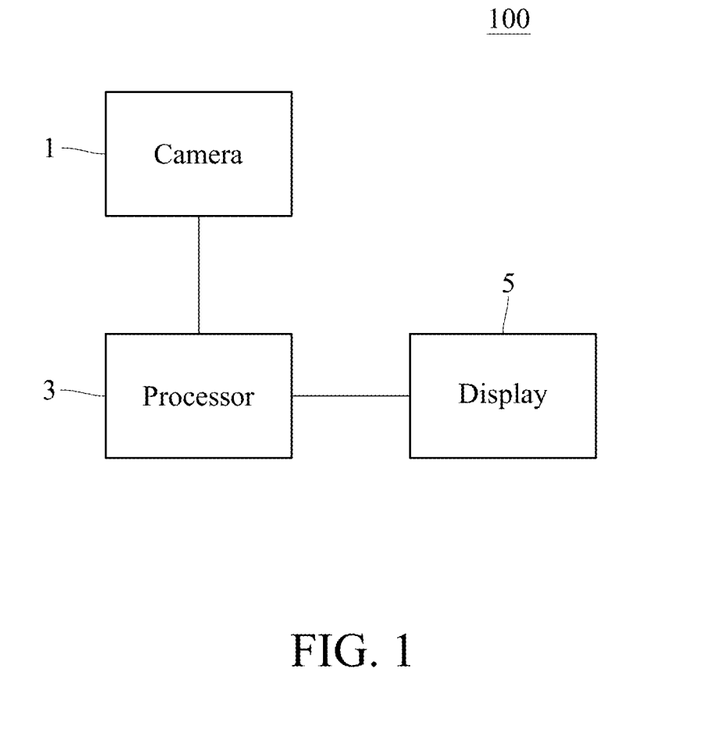
FIG. 1 is a block diagram of an image processing system according to an embodiment of the present disclosure.

FIG. 1 is a block diagram of an image processing system 100 according to an embodiment of the present disclosure. In this embodiment, the image processing system 100 includes a camera 1, a processor 3, and a display 5. The processor 3 is electrically connected to the camera 1 and the display 5. In other embodiments, the present disclosure does not limit the installation location of the processor 3. For example, the processor 3 and the camera 1 may be installed in the same device or separately. In other embodiments, the display 5 may be an external device, which is set separately from the processor 3 and the camera 1. For example, the image processing system 100 may be a device (such as a document camera) including the camera 1 and the processor 3, and this device is electrically connected to a display 5.

The camera 1 records a target object to generate a video. The processor 3 is configured to execute a plurality of instructions. The plurality of instructions relates to a method for transparentizing a target object according to an embodiment of the present disclosure. The plurality of instructions takes a plurality of frames of the video as input, and generates an output frame. The display 5 is configured to show an output video according to the output frame.

Figure 2:
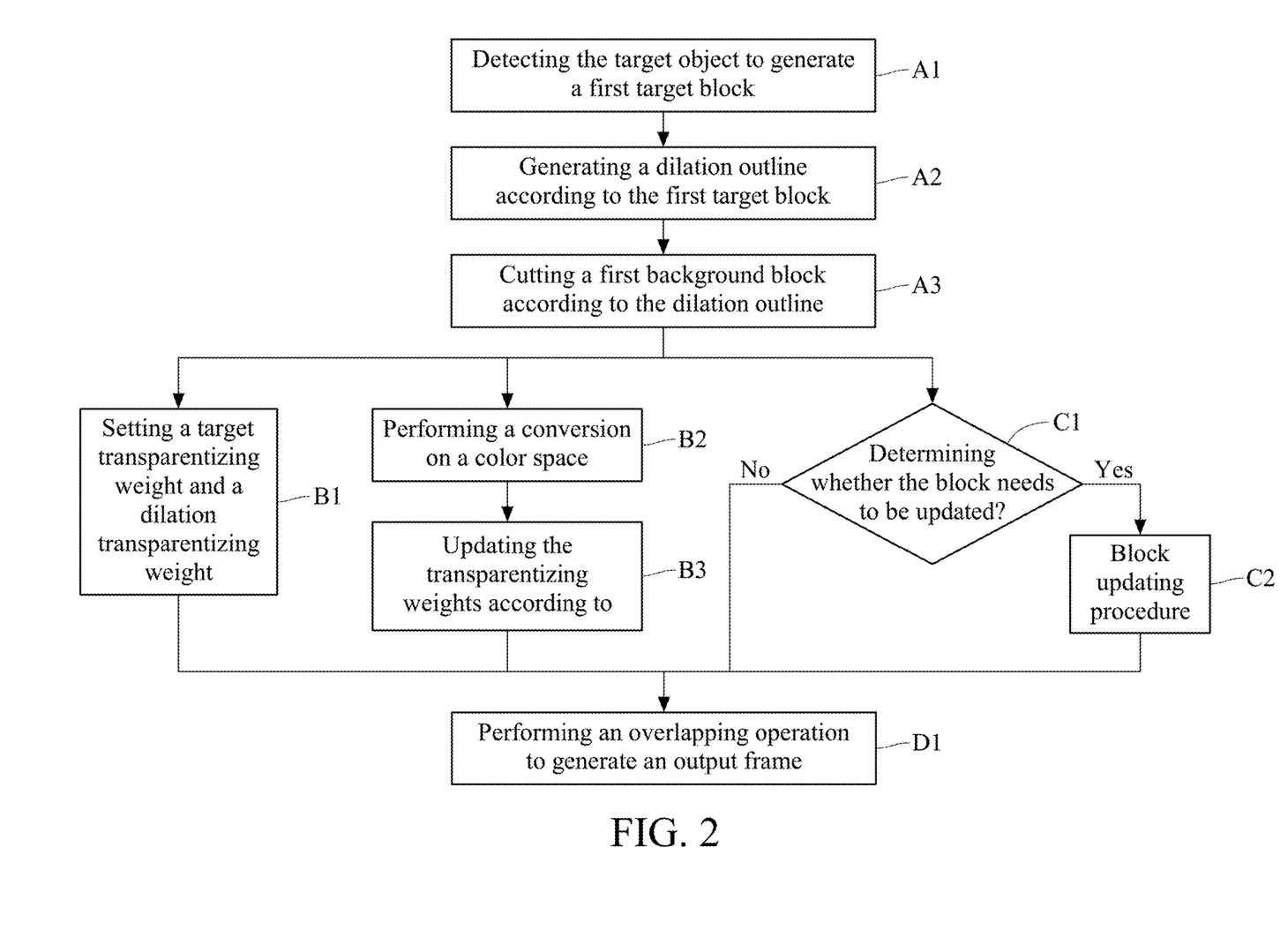
FIG. 2 is a flowchart of a method for transparentizing a target object according to an embodiment of the present disclosure.

FIG. 2 is a flowchart of a method for transparentizing a target object according to an embodiment of the present disclosure. This method applies to a video, and includes a video cutting stage, a foreground processing stage, a background processing stage, and a video outputting stage. The video cutting stage includes steps A1, A2, and A3. The foreground processing stage includes steps B1, B2, and B3. The background processing stage includes steps C1, and C2. The video outputting stage includes step D1. In other embodiments of the present disclosure, aside from the video cutting stage and the video outputting stage, which must be performed, one may choose to only perform either the foreground processing stage or the background processing stage, with the other done in accordance with known practices for the foreground processing stage or the background processing stage.

Please refer to FIG. 2, in the video cutting stage, the processor 3 performs the following steps: step A1, "detecting a target object to generate a first target block"; step A2, "generating a dilation outline according to the first target block", step A3, "cutting a first background block according to the dilation outline".

In step A1, regarding to the first frame of the video, the processor 3 detects the target object to generate the first target block. Please refer to FIG. 3. The left side shows the first frame F and the first target block K0. The target object may be, for example, a human body. The shape of the first target block K0 may be a human figure that contains most of the human body outline, or it may be a rectangle that contains most of the human body outline. The present disclosure does not limit the shape of the first target block K0. In the first frame F, the first target block K0 is equivalent to the "foreground", and the part outside of the first target block K0 is equivalent to the "background".

Figure 3:
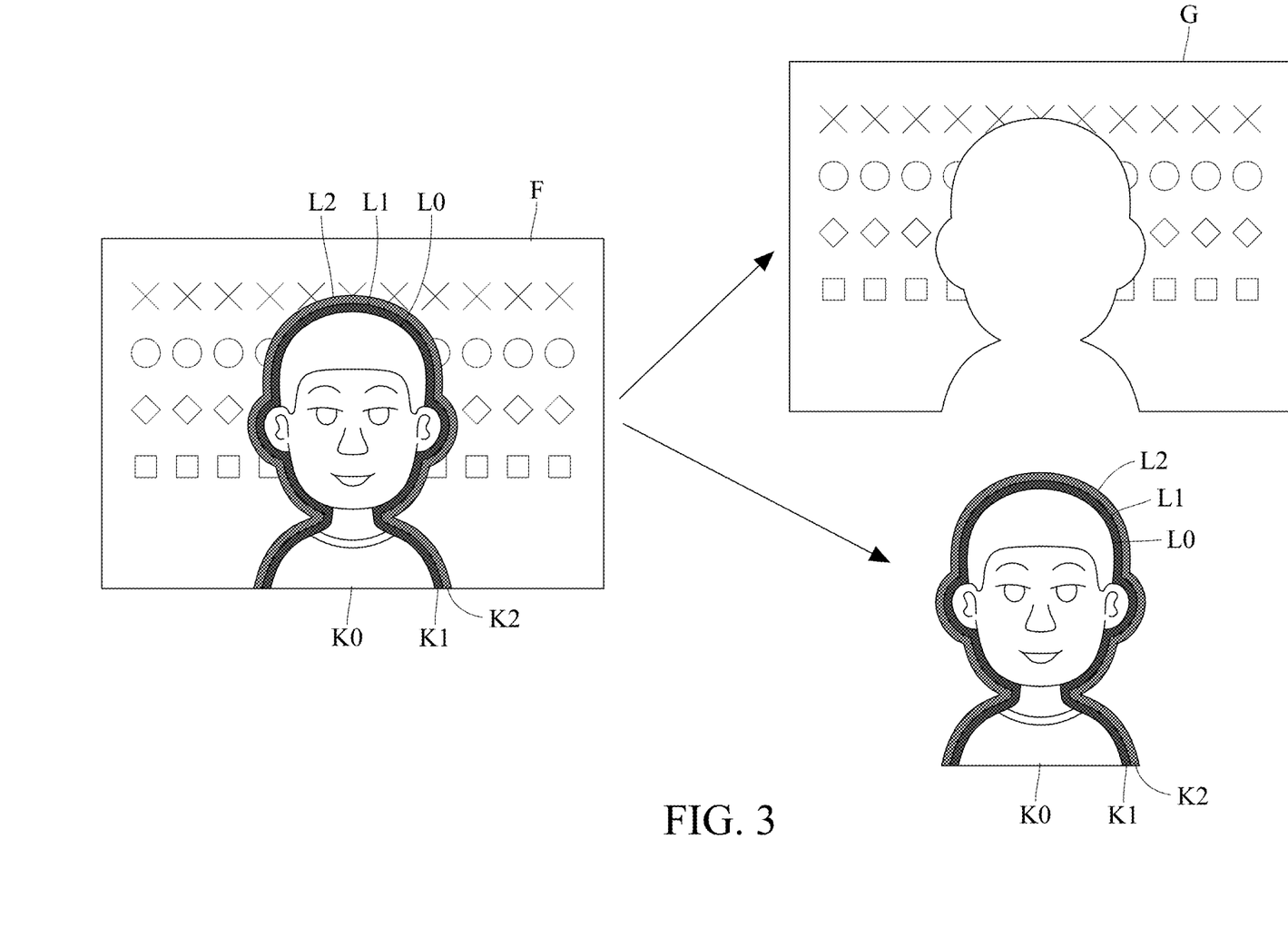
FIG. 3 is a schematic diagram showing a frame, a target block, a dilation outline, and a background block.

In step A1, the processor 3 extracts a first target block K0 from a first frame F of the video. In an embodiment, it only requires one frame to detect and extract the first target object K0. In other embodiments, two or more consecutive frames may be used to extract the first target object K0. Specifically, the processor 3 performs an object detection algorithm to the first frame F for detecting whether the first target block K0 exists or not (whether the first frame F records the target object). When the first target block K0 exists, the processor 3 performs an instance segmentation algorithm, such as Mask R-CNN, DeepMask, for obtaining a margin L0 of the target block K0 in the first frame F, and then extracts the first target block K0 according to the margin L0. The object detection algorithm may be, for example, single shot multibox detector (SSD), you only look once (YOLO), or neural network model (such as convolutional neural network (CNN), recurrent neural network (RNN), or deep neural network (DNN)). However, the present disclosure does not limit to the above examples.

In step A2, the processor 3 performs a dilation operation to the first target block K0 to generate a dilation outline enclosing the first target block K0. The left side of FIG. 3 is a schematic diagram of the first frame F, the first target block K0, the margin L0 of the first target block K0, and the first dilation outline L1 and the second dilation outline L2 generated by performing two dilation operations. The present disclosure does not limit the upper bound of the number of executions of the dilation operation.

For better understanding, an example of the dilation operation is given below, but the present disclosure is not limited thereto. The dilation operation uses a kernel. In an embodiment, the kernel is a rectangle whose anchor is centered by default. When the dilation operation is performed, every pixel in the image is scanned by the kernel, the first dilation outline L1 is obtained by performing logical operations according to the kernel and the image, and the second dilation outline L2 is obtained by performing the dilation operation to the first dilation outline L1.

In an embodiment, a dilation magnitude refers to a distance between L0 and L1 or a distance between L2 and L3. In another embodiment, the dilation magnitude refers to the distance between the dilation center to the dilation outline L1 or L2, while a different dilation direction may correspond to a different dilation magnitude.

In an embodiment, the processor 3 sets the dilation magnitude according to an area of the first target block K0. The dilation magnitude is proportional to the area of the first target block K0. In practice, as the camera 1 lens gets closer to the target object, the area of the first target block K0 becomes larger, and the setting value of the dilation magnitude increases.

In other embodiments, the processor 3 may also set the dilation magnitude according to the ratio of the area of the first target block K0 to the area of the first frame F0.

Based on at least one of the above embodiments of dilation magnitude and dilation direction, in step A2, the processor 3 expands the margin L0 of the first target block K0 outward M times and records the dilation outlines generated by the last N times, where M≥N≥1. The left side of FIG. 3 is a schematic diagram of the first target block K0, the first dilation outline L1, and the second dilation outline L2 (M=N=2), where the first dilation outline L1 is generated by performing the dilation operation once according to the margin L0 of the first target block K0, the second dilation outline L2 is generated by performing the dilation operation twice according to the margin L0 of the first target block K0 (or in an iterative manner, for example, the first dilation outline L1 is generated by performing the dilation operation once according to the margin L0 of the first target block K0, and the second dilation outline L2 is generated by performing the dilation operation once according to first dilation outline L1). As shown in the left side of FIG. 3, the shape of the first target block K0 is basically identical to the shape enclosed by each of the dilation outlines L1 and L2, which are human-shaped.

As described above, the shape of the first target block K0 may include most parts of the human body contours. However, it is possible that the instance segmentation algorithm adopted in step A1 cannot perform a perfect cutting of the human figure and the background. Theoretically, all the pixels corresponding to the clothes of the target object in the first frame F should be all inside the first target block K0. However, in practice, some of these pixels may be classified outside of the first target block K0 by the algorithm. Therefore, the present disclosure solves the problem of insufficient accuracy of the instance segmentation algorithm by adjusting the number of dilation operations or the size of the dilation magnitude.

In step A3, the processor 3 cuts first background block G according to the largest dilation outline (such as the second dilation outline L2 in FIG. 3), this may avoid storing the part of the human figure (that is, the part that is not successfully cut by the instance segmentation algorithm) in the first background block G, and avoid causing afterimages in the output video. The output of step A3 is shown as the right side of FIG. 3, where the upper part is the first background block G deducting the second dilation outline L2, and the lower part is the first target block K0, the first dilation region K1 and the second dilation region K2. The first target block K0 is a region inside the margin L0 of the first target block K0. The first dilation region K1 is a region outside the first target block K0 and inside the first dilation outline L1. The second dilation region K2 is a region outside the first dilation region K1 and inside the second dilation outline L2.

Overall, the flow of the video cutting stage includes extracting a target block corresponding to the target object from the frame of the video, performing the dilation operation to the target block to generate the dilation outline enclosing the target block; and cutting the background block from the frame according to dilation outline.

Please refer to FIG. 2. In the foreground processing stage, the processor 3 performs the following steps: step B1, "setting a target transparentizing weight and a dilation transparentizing weight"; step B2, "performing a conversion on a color space"; and step B3, "updating the transparentizing weights according to the number of pixels whose degree of saturation is greater than a saturation threshold."

In step B1, the processor 3 sets the target transparentizing weight corresponding to the target block and sets the dilation transparentizing weight corresponding to the dilation region. The dilation transparentizing weight is different from the target transparentizing weight. For example, the dilation transparentizing weight is not greater than the target transparentizing weight.

In a definition of an embodiment, the larger the value of transparentizing weight is, the less transparent the block appears visually when this transparentizing weight is applied, while the smaller the value of transparentizing weight is, the more transparent the block appears visually. However, the present disclosure does not limit to the above definition. In practice, for the convenience of calculation, the transparentizing weight opposite to the above definition may also be used (the larger the value is, the more transparent; the smaller the value is, the less transparent).

In an embodiment, the target transparentizing weight is a fixed value smaller than 1, such as 0.3. In another embodiment, the target transparentizing weight is determined according to an area ratio. The area ratio is the ratio of the area of the first target block K0 to the area of the first frame F, and the area ratio is proportional to the target transparentizing weight. In other words, after the method of the present disclosure is completed, the larger the first target block K0 is, the less transparent it appears visually, while the smaller the first target block K0 is, the more transparent it appears visually.

In an embodiment, different dilation regions correspond different dilation transparentizing weights. The area of the dilation region (or the area enclosed by the dilation outline) is inversely proportional to the dilation transparentizing weight. In other words, the larger the dilation region is, the smaller its corresponding dilation transparentizing weight is. Taking FIG. 3 as an example, the dilation transparentizing weight of the second dilation outline L2 is not greater than the dilation transparentizing weight of the first dilation outline L1. Therefore, the second dilation region K0 visually appears more transparent than the first dilation region K1.

The scope of application of the target transparentizing weight is all pixels in the first target block K0, and the scope of application of the dilation transparentizing weight is all pixels in the dilation region. Taking FIG. 3 as an example, if the target transparentizing weight is 0.7, its scope of application is all pixels in the first target block K0; if the dilation transparentizing weight of the first dilation outline L1 is 0.5, its scope of application is all pixels in the first dilation region K1; if the dilation transparentizing weight of the second dilation outline L2 is 0.3, its scope of application is all pixels in the second dilation region K2.

Figure 4:
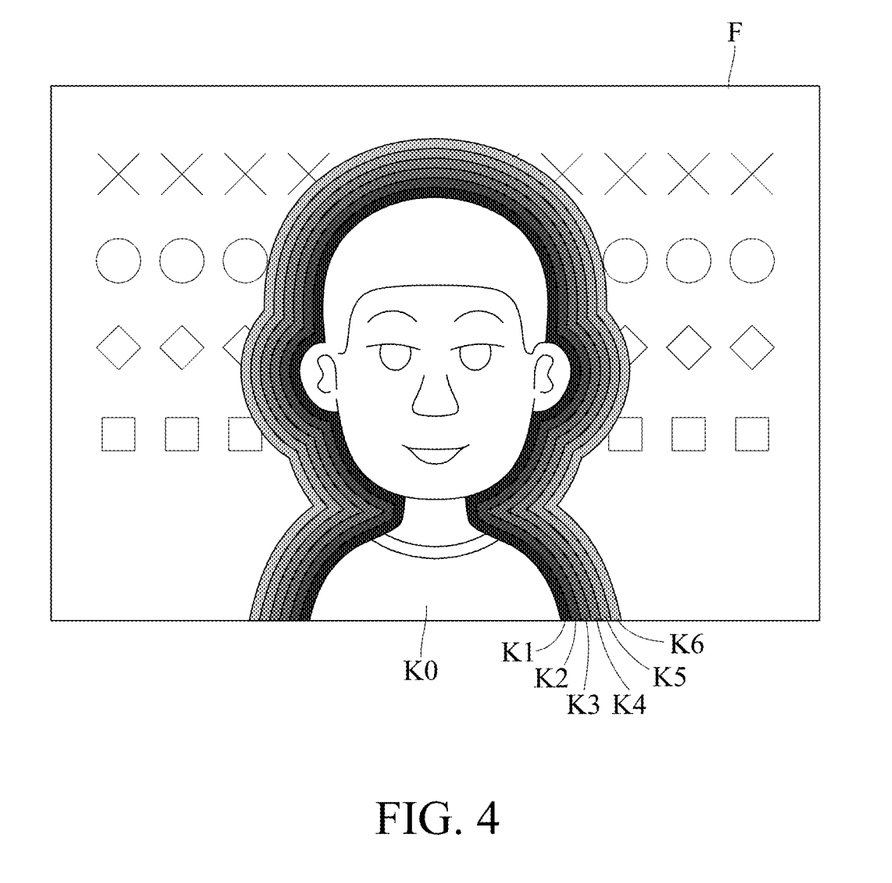
FIG. 4 is a visual effect diagram of a plurality of dilation outlines and their corresponding dilation transparentizing weights.

In the prior art, the overlapping operation between the human figure and the background is typically performed by using a fixed target transparentizing weight and the background transparentizing weight, but this approach visually highlights the margin between the human figure and the background, so that the viewer inevitably notices the color difference between the human figure and the background. Therefore, the present disclosure proposes the dilation region and the dilation transparentizing weight to solve the problem. Since different dilation regions correspond to different dilation transparentizing weights, the presentation of transparency has a gradient effect as shown in FIG. 4. In FIG. 4, by setting the dilation transparentizing weight from large to small, the first to sixth dilation regions K1 to K6 become more and more transparent from the inside to the outside. The target transparentizing weight and the dilation transparentizing weight proposed by the present disclosure may reduce the color difference between the human figure margin and the background, so that the visual effect of the transparentized figure is more realistic and prevent the viewer from noticing the margin between the figure and the background.

In step B2, the processor 3 performs the conversion the color space of the first target block K0. In an embodiment, the color space of the video belongs to RGB (Red, Green, Blue), and the processor 3 coverts the color space of the first target block K0 to HSV (Hue, Saturation, Lightness). In another embodiment, if the color space of the video belongs to HSV, step B2 may be omitted.

Because all the pixels in the target block adopt the same target transparentizing weight, in a visual perspective, the transparency of a pixel with a high degree of saturation may be worse than the transparency of a pixel with a low degree of saturation, so the viewers cannot clearly see the contents located in the background block (such as the text on a blackboard). Considering the above situation, the present disclosure proposes an updated mechanism for updating the target transparentizing weight in step B3.

In step B3, the processor 3 updates the target transparentizing weight according to the number of pixels whose degree of saturation is greater than the saturation threshold. Specifically, the processor 3 selects at least one pixel as a saturated pixel group from the plurality of pixels inside the dilation outline (including all of the dilation regions and the target block, i.e., maximal range of dilation based on the human figure), and then sets a saturation transparentizing weight according to the number of pixels of the saturated pixel group, and then updates the target transparentizing weight according to the saturation transparentizing weight; where the degree of saturation of each pixel in the saturated pixel group is greater than the saturation threshold. The principal of step B3 is to determine whether all pixels in the dilation outline have a large number (or a high proportion) of high-degree-of-saturation pixels. If the determination result is "yes", it needs to reduce the transparentizing weight to improve the visual transparency of these high-degree-of-saturation pixels. There are two implementation methods for the determination. The first implementation method is to determine whether the ratio of high-degree-of-saturation pixels is greater than a ratio threshold. The second implementation method is to determine whether the number of high-degree-of-saturation pixels is greater than a quantity threshold. The actual values listed in Table 1 are used to illustrate these two determination methods, but the present disclosure is not limited by these values.

TABLE 1

| Dilation outline | Number of pixels | Saturation threshold (range: 0-255) |
|---|---|---|
| First | 60 | 100 |
| Second | 80 | 150 |
| Third | 100 | 200 |

| Saturated pixel group | Number of pixels (Quantity threshold: 20) | Ratio of saturated pixels | Saturation transparentizing weight |
|---|---|---|---|
| First | 30 | 0.3 (30/100) | 0.2 |
| Second | 20 | 0.2 (20/100) | 0.4 |
| Third | 10 | 0.1 (10/100) | 0.6 |

If the degree of saturation of a pixel ranges from 0 to 255, and the processor 3 performs three dilation operations to generate the first, second, and the third dilation outlines, where the area enclosed by the third dilation outline is greater than the area enclosed by the first or second dilation outline. The first, second and third dilation outlines respectively contain 60, 80 and 100 pixels inside. The processor 3 determines to which saturated pixel group each of the 100 pixels belongs according to the saturation threshold, where the default values of the saturation thresholds corresponding to the first, second and third saturated pixel groups are 100, 150 and 200. Suppose that the number of first, second and the third saturated pixel group are 30, 20, and 10, respectively.

In the first implementation that determines whether the high-degree-of-saturation pixel affects the transparentizing weight, the processor 3 calculates the ratio of the number of pixels in each of the saturated pixel groups to the number of pixels inside the third dilation outline, and obtains three values of 0.3, 0.2, and 0.1, respectively corresponding to the first, second and third saturated pixel groups. If the ratio threshold is 0.15, and the saturation transparentizing weights corresponding to the first, second and third saturated pixel groups are 0.2, 0.4, and 0.6 respectively, since 0.2>0.15 and 0.3>0.15, the processor 3 may adopt one of the saturation transparentizing weight corresponding to the second and third saturated pixel groups (0.4 or 0.6) as the saturation transparentizing weight, and update the target transparentizing weight according to the adopted saturation transparentizing weight.

In the second implementation that determines whether the high-degree-of-saturation pixel affects the transparentizing weight, if the quantity threshold is 15, since 20>15 and 30>15, the processor 3 may adopt one of the saturation transparentizing weight corresponding to the second and third saturated pixel groups (0.4 or 0.6) as the saturation transparentizing weight, and update the target transparentizing weight according to the adopted saturation transparentizing weight.

Please refer to FIG. 2. In step B1, the processor 3 sets or calculates a temporary target transparentizing weight according to a default value. In step B3, the methods that the processor 3 updates this temporary target transparentizing weight include: setting the product of the temporary target transparentizing weight and the saturation transparentizing weight as an updated target transparentizing weight, or calculating a weighted average of the target transparentizing weight and the saturation transparentizing weight as an updated target transparentizing weight.

Please refer to FIG. 2, in the background processing stage, the processor 3 performs the following steps: step C1, "determining whether the block needs to be updated"; if the determination result is "yes", step C2 will be performed; if the determination result is "no", step D1 will be performed; and step C2 is a "block updating procedure".

Figure 5:
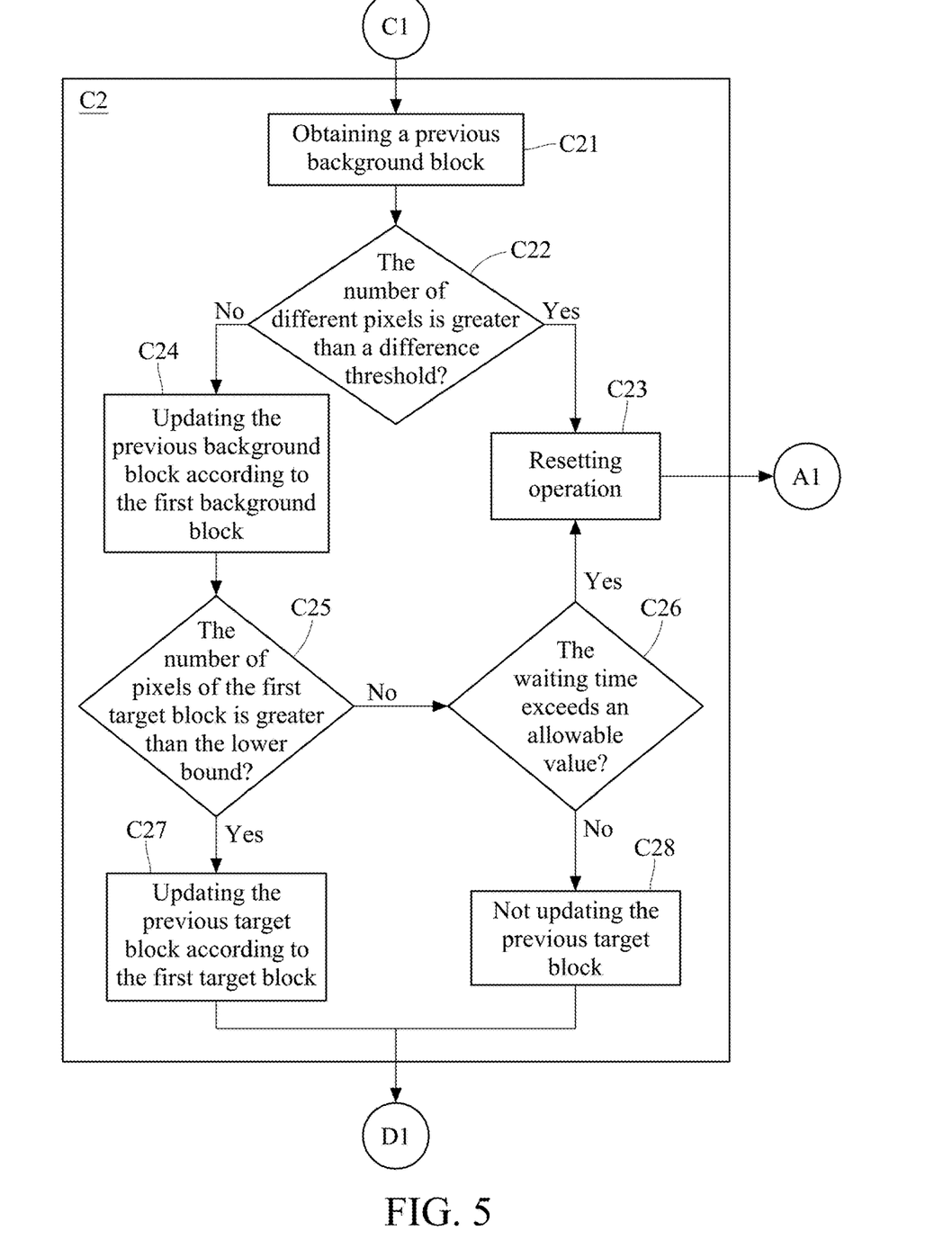
FIG. 5 is a flowchart of a block update procedure according to an embodiment of the present disclosure.

FIG. 5 is a flowchart of a block update procedure according to an embodiment of the present disclosure. The block update procedure C2 includes four stages. The first stage is used to obtain a previous background block and includes step C21. The second stage is used to determine whether the lens moves or the target object moves, and includes step C22. The third stage is used to process the block update when the lens moves, and includes step C23. The fourth stage is used to process the block update when the target objects moves, and includes steps C24, C25, C26, C27 and the C28.

In step C21, the background block (the first background block G) generated when the method was executed last time is stored as the previous background block, and the processor 3 obtains this previous background block.

During the process of recording the video by camera 1, both the lens of the camera 1 and the target object may move. When the lens moves, the background usually changes substantially significantly. When the target object moves, the background usually changes slightly. In the second stage, the processor 3 determines whether the recording of the first frame compared to the recording of the previous frame has one of the above two moving conditions.

In the second stage, the processor 3 performs step C22, "determining whether the number of different pixels is greater than the difference threshold". If the determination result is "yes", step C23 is performed. If the determination result is "no", step C24 is performed. Specifically, based on a pixel scale, the processor 3 determines the number of different pixels between the first background block and the previous background block according to the Mixture of Gaussian (MOG) model. In other words, the MOG algorithm is performed after the dilation region is removed from the frame. In the first background block and the previous background block, regarding two pixels of the same location, the processor 3 calculates whether these two pixels have different pixel values. If the determination result is "yes", the pixel of the location is labeled as different pixel in the first background block. After all of the different pixels are labeled, the processor 3 uses each of the different pixels to determine whether the background movement or target object movement occurs according to the MOG model. If a different pixel reflects the target object movement, the label of this different pixel will be removed. Finally, the processor 3 uses the number of pixels still labeled as different pixel as "the number of different pixels".

When the number of different pixels is greater than the difference threshold, it represents the situation of camera movement (or scene conversion), because the different pixel caused by the target object movement has been deducted, and the processor 3 proceeds to the third stage. When the number of different pixels is not greater than the difference threshold, it represents the situation of target object movement and the processor 3 proceeds to the fourth stage. In addition to adopting the determination mechanism of the difference threshold, in another embodiment, the processor 3 may calculate a difference ratio of the number of different pixels to the number of frame pixels, determine whether this difference ratio is greater than a difference ratio threshold, and use the determination result as a basis to decide whether the third stage or the fourth stage will be performed next.

The third stage is used to process the block update of lens movement, and includes step C23, "reset operation". The reset operation includes: deleting the first background block and the previous background block by the processor 3, and resetting the target transparentizing weight and the dilation transparentizing weight, outputting the first frame F (the first frame F obtained from the video by the processor 3 in step A1), and then returning to step A1 to continue the flow shown in FIG. 2, and thereby re-obtaining a new background block.

The fourth stage is used to process the block update of target object movement and includes steps C24-C28. Step C24 is to update the previous background block according to the first background block. Step C25 is to determine whether the number of pixels of the first target block is greater than a lower bound. Step C26 is to determine whether the waiting time exceeds an allowable value. Step C27 is to update a previous target block according to the first target block. Step C28 is "do not update the previous target block.

When the number of different pixels is not greater than the difference threshold, in step C24, the processor 3 updates the previous background block according to the first background block. Regarding the update method, for example, the processor 3 replaces the previous background block with the first background block, or the processor 3 replaces the pixel of previous background block with the pixel of the first background block, where the replaced pixel is different from the pixel in the first background block.

In steps C22-C24, the update mechanism for the background block has been fully explained. The following explains the update mechanism and considerations for the target block.

In step C25, the processor 3 determines whether the first target block exists. Specifically, after updating the previous background block according to first background block, the processor 3 determines whether the number of pixels of the first target block is greater than the lower bound. The value of the lower bound may be adjusted dynamically according to the number of pixels of the previous target block. In other embodiments, other parameters such as the shape of the first target block may be adopted as the determination mechanism for determining whether the first target block exists. When the number of pixels of the first target block is not greater than the lower bound, the processor 3 accumulates the waiting time and performs step C26. When the number of pixels of the second target block is greater than the lower bound, the processor 3 performs step C27 next.

In step C26, if the waiting time exceeds the allowable value, the processor 3 performs step C23 next, deletes the previous background block and the first background block, and resets the target transparentizing weight and the dilation transparentizing weight. If the waiting time does not exceed the allowable value, the processor 3 performs step C28 next.

If the first target block exists, the processor 3 may perform step C27 to update the previous target block according to the first target block. The update method may refer to that of the background block described above.

In step C28, the processor 3 does not update the previous target block. Therefore, the subsequent step D1 will use original previous target block.

The update considerations about the target block are described as follows: In practice, the accuracy rate of the object detection algorithm adopted in step A1 and the A1' may not reach 100%, so the following situations may occur: processor 3 detects the target object in the previous frame but does not detect the target object in the first frame (or misjudge other objects as the target object). If the wrong first target block is used in subsequent operations, the part other than the human figure may be transparentized wrongly, thereby affecting the viewing experience. Therefore, the present disclosure solves this problem through steps C25 and C26. Step C25 is used to determine whether the output of the object detection algorithm performed in step A1' is normal. If the number of pixels of the first target block is greater than the lower bound, it represents that the object detection algorithm generates the first target block successfully this time. Therefore, a new target block replaces the old target block in step C27. On the other hand, if the number of pixels of the first target block is smaller than the lower bound, it represents that the object detection algorithm does not generate the first target block this time. Therefore, the processor 3 continues to use the previous target block for subsequent overlapping operations, thus avoiding the sudden disappearance and reappearance of the human figure in visual appearance.

Please refer to FIG. 2. In the video outputting stage, the processor 3 performs step D1, "performing an overlapping operation to generate an output frame". Please refer to FIG. 6, which is a schematic diagram of the overlapping operation according to an embodiment of the present disclosure and adopts the example of FIG. 3. Specifically, the processor 3 performs the overlapping operation to generate the output frame according to the previous background block KH, the background block G, the first target block K0, the target transparentizing weight, the first dilation outline L1, the second dilation outline L2 and the dilation transparentizing weight.

Figure 6:
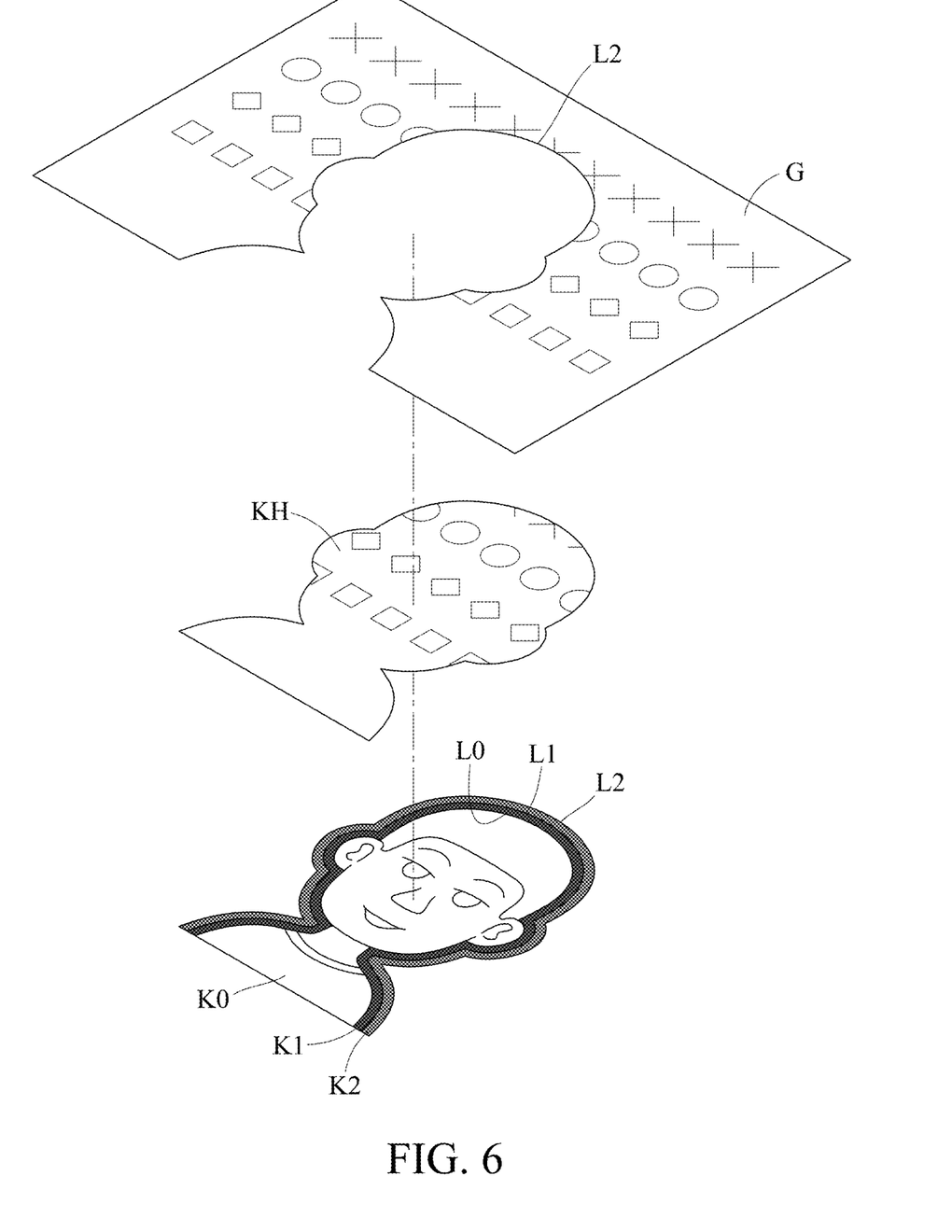
FIG. 6 is a schematic diagram of an overlapping operation according to an embodiment of the present disclosure.

The first target block K0 described above refers to the first target block K0 updated in step C27 or the first target block K0 not updated in step C28. The target transparentizing weight refers to the target transparentizing weight updated in step B3. The dilation outlines L1 and L2 are generated in step A2. The dilation transparentizing weight is generated in step B1.

The background block G is the first background block updated in step C24 or the first background block generated by returning to step A1 and then re-cutting from the frame. The transparentizing weight corresponding to the background block G is fixed to 1. Since there is no pixel corresponding to the target object in the background block G, there is no need for transparency. It should be noted that the previous background block KH also includes selecting one of the multiple previous background blocks temporarily stored in the last few times. The location of the selected previous background block KH corresponds to that of the first target block K0, and the selected previous background block KH does not correspond to the target object. In addition, the area of the previous background block KH should be greater than or equal to the first target block K0. Therefore, after the previous background block KH and the first target block K0 are overlapped with the corresponding transparentizing weight, the target object may have a transparentizing effect, where the weight corresponding to the previous background block KH is, for example, the difference between the fixed value 1 minus the target transparentizing weight. In an embodiment, the processor 3 multiplies the pixel value of each pixel of the target block by the target transparentizing weight, multiplies the pixel value of each pixel of the previous background block by the transparentizing weight corresponding to the previous background block KH, and then adds the pixel values belonging to the same location in the two blocks, and the transparentizing weight corresponding to the previous background block is inversely proportional to the target transparentizing weight.

In practice, the processor performs step D1 multiple times to generate a plurality of output frames, these output frames form an output video, and the block corresponding to the target object in the output video has a visually transparent effect, so the viewer may see the information blocked by the target object in the real world.

In view of the above, the method for transparentizing the target object proposed by the present disclosure and the image processing system have good transparency effect for the target object. The output video generated by using the present disclosure will not visually show the obvious separation line between the target object and the background. The present disclosure improves the shortcomings of the known object detection algorithm and the instance segmentation algorithm. The present disclosure improves the visual effect of the transparentized target object through the mechanism of multiple dilation outlines corresponding to multiple dilation transparentizing weights, and delays to update target block to avoid the afterimage of target object in the video. The present disclosure further dynamically adjusts the transparentizing weight of the target object according to the degree of saturation of the target object. Even if the speaker wears bright clothes, the viewer seeing the output video may see the blackboard text behind the transparentized speaker.

What is claimed is:

1. A method for transparentizing a target object of a video comprising a plurality of steps performed by a processor, wherein the plurality of steps comprises:
    extracting a target block corresponding to the target object from a frame of the video; setting a target transparentizing weight corresponding to the target block;
    performing a dilation operation to the target block to generate a dilation outline enclosing the target block;
    setting a dilation transparentizing weight corresponding to a dilation region, wherein the dilation region is a region inside the dilation outline and outside the target block, and the dilation transparentizing weight is different from the target transparentizing weight;
    cutting a background block from the frame according to the dilation outline; and
    performing an overlapping operation according to a previous background block, the background block, the target block, the target transparentizing weight, the dilation region, and the dilation transparentizing weight to generate an output frame, wherein the previous background block does not correspond to the target object;
    wherein before generating the output frame, selecting at least one pixel as a saturated pixel group from a plurality of pixels in the dilation outline, wherein a degree of saturation of each pixel of the saturated pixel group is greater than a saturation threshold;
    setting a saturation transparentizing weight according to a number of pixels of the saturated pixel group; and
    updating the target transparentizing weight according to the saturation transparentizing weight.

2. The method for transparentizing the target object of the video of claim 1, wherein performing the dilation operation to the target block comprises:
    setting a dilation magnitude according to an area of the target block, wherein the dilation magnitude is proportional to the area of the target block; and
    performing the dilation operation to generate the dilation outline according to the dilation magnitude and a center point of the target block.

3. The method for transparentizing the target object of the video of claim 1, further comprising: before extracting the target block from the frame of the video,
    performing an object detection algorithm to the frame for detecting whether the target block exists or not;

when the target object exists, performing an instance segmentation algorithm for obtaining a margin of the target object; and extracting the target block according to the margin of the target object.

4. The method for transparentizing the target object of the video of claim 1, wherein the frame is a first frame, the target block is a first target block, the background block is a first background block, and the method for transparentizing the target object further comprises:

obtaining the previous background block, and determining, based on a pixel scale, a number of different pixels between the first background block and the previous background block according to a mixture of Gaussian model; wherein when the number of different pixels is greater than a difference threshold, deleting the previous background block and the first background block, and resetting the target transparentizing weight and the dilation transparentizing weight; and when the number of different pixels is not greater than the difference threshold, updating the previous background block according to the first background block.

5. The method for transparentizing the target object of the video of claim 4, further comprising: after updating the previous background block according to the first background block, determining whether a number of pixels of the first target block is greater than a lower bound;

when the number of pixels of the first target block is greater than the lower bound, updating a previous target block according to the first target block;

when the number of pixels of the first target block is not greater than the lower bound, accumulating waiting time, wherein when the waiting time exceeds an allowable value, deleting the previous background block and the first background block, and resetting the target transparentizing weight and the dilation transparentizing weight; and when the waiting time does not exceed the allowable value, updating the previous target block according to the first target block.

6. A method for transparentizing a target object of a video comprising a plurality of steps performed by a processor, wherein the plurality of steps comprises: extracting a first target block and a first background block from a first frame of the video, wherein the first target block corresponds to the target object, and the first background block does not correspond to the target object;

setting a target transparentizing weight corresponding to the first target block;

performing a dilation operation to the first target block to generate a dilation outline enclosing the first target block;

extracting a second target block and a second background block from a second frame of the video, wherein the second frame is delayed from the first frame, the second target block corresponds to the target object, and the second background block does not correspond to the target object;

determining, based on a pixel scale, a number of different pixels between the second background block and the first background block according to a mixture of Gaussian model; wherein when the number of different pixels is greater than a difference threshold, deleting the first background block and the second background block, and resetting the target transparentizing weight;

when the number of different pixels is not greater than the difference threshold, updating the first background block according to the second background block to generate an updated first background block; and performing an overlapping operation according to a previous background block, the updated first background block, the target transparentizing weight, and one of the first target block and the second target block to generate an output frame;

wherein before generating the output frame, selecting at least one pixel as a saturated pixel group from a plurality of pixels in the dilation outline, wherein a degree of saturation of each pixel of the saturated pixel group is greater than a saturation threshold;

setting a saturation transparentizing weight according to a number of pixels of the saturated pixel group; and updating the target transparentizing weight according to the saturation transparentizing weight.

7. The method for transparentizing the target object of the video of claim 6, further comprising: after updating the first background block according to the second background block, determining whether a number of pixels of the second target block is greater than a lower bound;

when the number of pixels of the second target block is greater than the lower bound, updating the first target block according to the second target block;

when the number of pixels of the second target block is not greater than the lower bound, accumulating waiting time, wherein when the waiting time exceeds an allowable value, deleting the first background block and the second background block, and resetting the target transparentizing weight; and when the waiting time does not exceed the allowable value, updating the first target block according to the second target block.

8. An image processing system comprising:

a camera, configured to record a target object to generate a video;

a display, configured to show an output video according to an output frame; and a processor, electrically connected to the camera and the display, wherein the processor is configured to execute a plurality of instructions to generate the output frame, and the plurality of instructions comprises:

extracting a target block corresponding to the target object from a frame of the video;

setting a target transparentizing weight corresponding to the target block;

performing a dilation operation to the target block to generate a dilation outline enclosing the target block;

setting a dilation transparentizing weight corresponding to a dilation region, wherein the dilation region is a region inside the dilation outline and outside the target block, and the dilation transparentizing weight is different from the target transparentizing weight;

cutting a background block from the frame according to the dilation outline; and performing an overlapping operation according to a previous background block, the background block, the target block, the target transparentizing weight, the dilation region, and the dilation transparentizing weight to generate an output frame, wherein the previous background block does not correspond to the target object;

wherein the processor is further configured to:
select at least one pixel as a saturated pixel group from a plurality of pixels in the dilation outline, wherein a degree of saturation of each pixel of the saturated pixel group is greater than a saturation threshold;
set a saturation transparentizing weight according to a number of pixels of the saturated pixel group; and
update the target transparentizing weight according to the saturation transparentizing weight.

* * * * *